United States Patent [19]
Limberg et al.

[11] Patent Number: 6,029,766
[45] Date of Patent: *Feb. 29, 2000

[54] ADJUSTABLE POWER STEERING PROPORTIONING VALVE

[75] Inventors: Michael K. Limberg, McHenry; Kevin A. Stockert, Cary; James R. Cotteleer, Fox River Grove; Gary Heidt, Rolling Meadows, all of Ill.

[73] Assignee: Heidt's Hot Rod Shop, Inc., Wauconda, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/877,226

[22] Filed: Jun. 17, 1997

[51] Int. Cl.[7] .................................................. B62D 5/087
[52] U.S. Cl. .......................... 180/441; 180/442; 137/540
[58] Field of Search ..................................... 180/417, 421, 180/423, 442, 441; 137/596.12, 540; 91/451

[56] References Cited

U.S. PATENT DOCUMENTS

| | | | |
|---|---|---|---|
| 2,755,817 | 7/1956 | Barr | 137/536 |
| 3,297,049 | 1/1967 | Moskovitz | 137/540 |
| 4,702,335 | 10/1987 | Cage et al. | 180/142 |
| 4,768,604 | 9/1988 | Schipper | 180/143 |
| 4,901,812 | 2/1990 | Ferguson | 180/142 |

*Primary Examiner*—Anne Marie Boehler
*Assistant Examiner*—Avraham H. Lerner
*Attorney, Agent, or Firm*—Olson & Hierl, Ltd.

[57] ABSTRACT

An adjustable power steering valve for a vehicle steering system for selectively varying the pump pressure to the steering box. The power steering valve is positioned between the pressure line from the pump to the steering box and the return line from the steering box to the reservoir. It functions, when closed, to apply full pump pressure to the steering box. The power steering valve can be opened to a predetermined adjustable position to bypass fluid from the pressure line to the return line to selectively reduce the fluid pressure applied to the steering box.

7 Claims, 1 Drawing Sheet

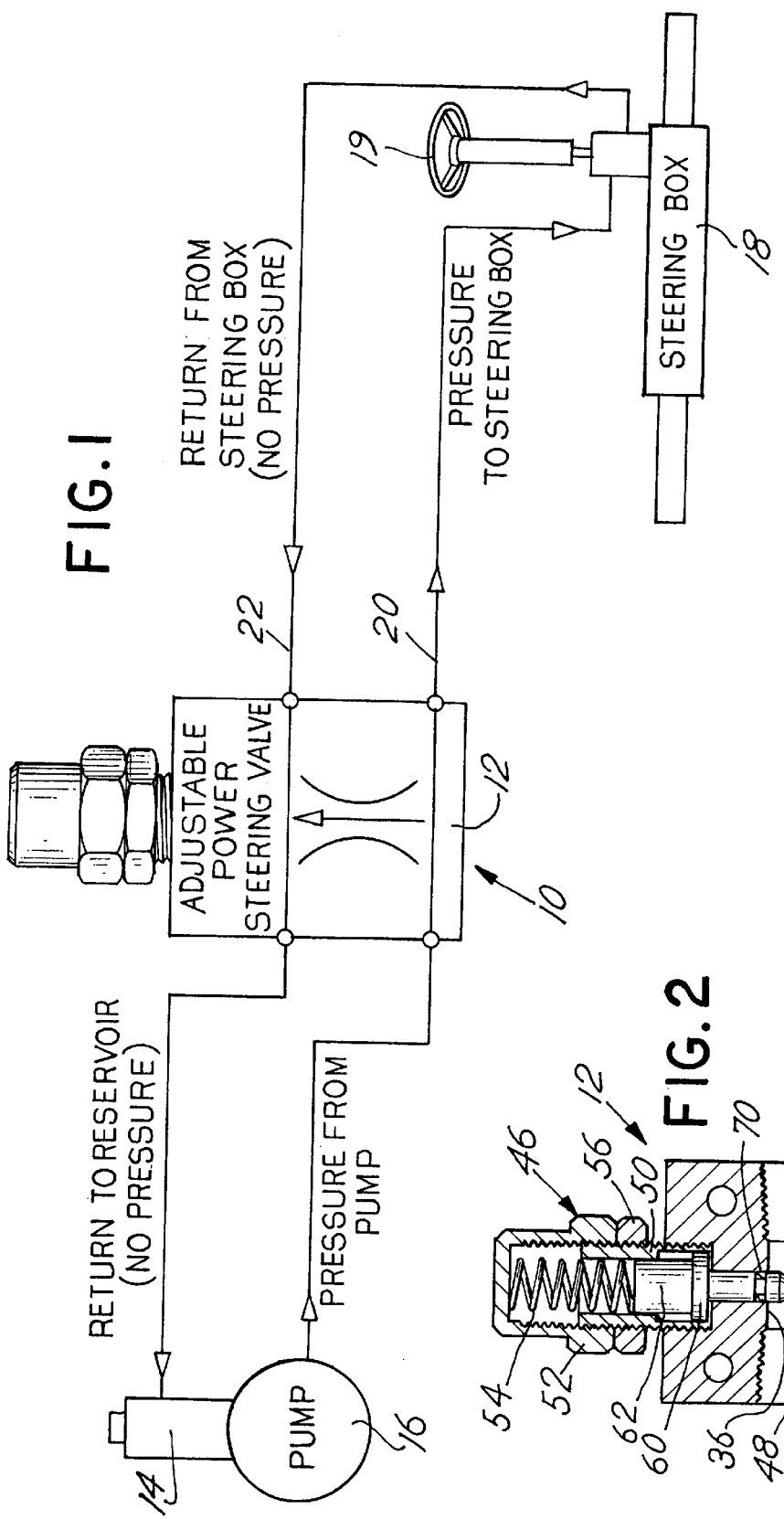

ADJUSTABLE POWER STEERING PROPORTIONING VALVE

BACKGROUND OF THE INVENTION

This invention pertains generally to a vehicle power steering system of the type including a rack and pinion gear associated with the steering wheel, and more particularly, an adjustable power steering proportioning valve associated with such vehicle steering system for varying, as desired, the pressure applied to the steering box of the power steering system.

Normally, a vehicle power steering system includes a fluid reservoir, a pump associated therewith, a first line communicating the pump and the steering box, and a second line communicating the steering box and the reservoir. A pressure bleed-off valve is provided in the pump, however, this valve is not adjustable. Typically, the driver must accept the factory design setting. He has no means for varying the pressure to the requirements of a particular car or the feel of the individual driver preference.

An object of the present invention is to provide a vehicle power steering system with an adjustable power steering proportioning valve that will enable a driver to selectively adjust the pressure in the vehicle power steering system.

Another object of the present invention is to provide an adjustable power steering valve for a power steering system that will allow the driver to adjust the force required to turn the steering wheel when the car is driven.

Other objects and advantages of the present invention will be made more apparent hereinafter.

BRIEF DESCRIPTION OF THE DRAWING

There is shown in the attached drawing a presently preferred embodiment of the present invention, wherein like numerals in the various views refer to like elements and wherein, FIG. 1 is a schematic view of an automotive steering system including an adjustable power steering proportioning valve, and FIG. 2 is a cross-sectional view of the adjustable power steering proportioning valve of the present invention.

DETAILED DESCRIPTION OF THE PRESENT INVENTION

Referring to FIG. 1, there is shown a schematic view of a vehicle, for example, automobile steering system 10 that includes the adjustable power steering proportioning valve 12 of the present invention. The power steering system 10 includes a hydraulic fluid reservoir 14 associated with a pump 16. The pump 16 is connected to the steering box 18 by a first line or conduit 20. A second line 22 communicates the steering box 18 with the reservoir 14. A steering wheel 19 is connected to the spine end extending from the steering box 18.

The adjustable power steering proportioning valve 12 is connected between the lines 20 and 22 for adjusting the pressure requirements to allow the driver to adjust the force required to turn the steering wheel. By adjusting the valve 12, the pressure in the hydraulic power steering system can be set as desired by the driver. The driver can reduce the pressure in the system to increase the force required to steer the car and to increase the feel of the road. Alternately, the driver can increase the pressure in the system to make the steering wheel easier to turn, so that driving is almost effortless.

Turning to FIG. 2, there is shown a cross-sectional view of the adjustable power steering valve of the present invention. The valve 12 includes a housing 26 having a first passage 28 connected in the line 20. As shown, each end of line 20 that connects to the housing 26 may be threaded for engaging the threaded ports 30 and 32 in the housing 26. Similarly, the ends of line 22 that connect to the threaded ports 38 and 40 at the ends of passage 36 are threaded. The transverse wall 42 in the housing 26 is provided with a hole 44 that when open will connect the first and second passages 28 and 36 within the housing 26. The first passage 28 can be considered a pressure passage as it is in the pressure line 20 from the pump 16. The second passage 36 can be regarded as a return passage as it is in the line 22 that returns fluid from the steering box 18 to the reservoir 14 in a non-pressurized state. The flow of fluid through the hole 44 is controlled by the adjustable valve 46, which includes a valve stem 48 movable into the hole 44, a sleeve 50 threadedly connected to the housing 26, a cap 52 threadedly connected to the sleeve 50, a spring 54 for biasing the valve stem 48 and a stop nut 56 for retaining the cap 52 in desired position with respect to the sleeve 50.

Considering the valve 12 more specifically, it will be noted that the valve stem or plunger 48 moves vertically as viewed in FIG. 2. The outside diameter of the lower end of the 20 valve stem 48 is only a few thousandths less than the internal diameter of the hole 44. Thus, when the lower end of the valve stem 48 is in the hole 44, fluid flow therethrough is substantially precluded. As the valve stem 48 is moved upwardly and out of the opening or hole 44, bypass of fluid from the first passage 28 in line 20 to the second passage 36 in line 22 is permitted. The valve stem 48 has an enlarged flange 60 and an upper body portion 62. The flange 60 is adapted to move within an internal recess 64 provided in the sleeve 50. The upper body portion 62 is adapted to move within the internal diameter of the sleeve 50. An o-ring 70 is positioned on valve stem 48 to prevent fluid in passage 36 from entering the chamber defined between cap 52 and sleeve 50. The spring 54 is positioned between the interior of the cap 52 and the top of the upper body portion 62 to apply a force to the valve stem 48, urging same to the closed position. When a force is applied to the valve stem equal to or greater than the pressure in line 20, the valve stem 48 will remain in position closing the bypass hole 44. Full pressure will be applied from the pump 16 to the steering box 18. When it is desired to bypass pressure from the first line 20 to the second line 22, so as to reduce the pressure applied to the steering box 18, the lock nut 56 is loosened, to permit the cap 52 to be rotated with respect to the sleeve 50 so as to lessen the pressure applied to the valve stem 48. The cap 52 can be selectively adjusted to provide the bypass of fluid desired by the driver to provide him with the feel desired for the particular vehicle and driving conditions. When the cap 52 has been positioned as desired, the lock nut 56 is adjusted so as to lock the cap 52 in place with respect to the sleeve 50.

In operation, when the power steering valve 12 is adjusted to seat the valve stem 48 fully in the hole 44, full pressure will flow to the steering box 18 from the pump 16, giving full and easy steering. When the cap 52 is adjusted to reduce the pressure of the spring 54 to a predetermined value, the valve stem 48 will open the passage 44 to permit pressurized flow to bypass the steering box 18 and pass to the second line 22 for return to the reservoir 14. Some pressure is allowed to flow in the return line 22. This reduces the power assist to the rack and pinion (not shown) in the steering box 18, which then requires increased pressure from the steering wheel 19 to steer the car.

An advantage of the present invention is that when the engine of the vehicle is idling, the spring 54 will urge the valve stem downwardly, reducing bypass of fluid and applying more pressure to the steering box 18 to apply more pressure to the rack and providing more power assist. On the highway, the pump pressure tends to be increased, but because of the spring load of the valve stem 48, the valve stem 48 will be moved upwardly to bypass pressure from the first line 20 to the second line 22. The spring load of the valve stem 48 provides for self compensation of the power steering valve 12 during various operating conditions.

The adjustable power steering proportioning valve of the present invention can be adjusted by the driver to any desired pressure setting. The driver can readjust or "tune" the power steering proportioning valve at any time as his needs or desires change.

While we have shown a presently preferred embodiment of the present invention, it will be apparent that the invention may be otherwise embodied within the scope of the following claims.

We claim:

1. In a vehicle steering system including a fluid reservoir, a pump for pressurizing fluid from the reservoir, a steering box, a first line communicating the pump to the steering box, and a second line communicating the steering box and the reservoir, the improvement comprising an adjustable power steering valve disposed between the first line and the second line for selectively varying the pump pressure to the steering box, said adjustable power steering valve including a housing having an internal bypass passage that communicates the first line and the second line, a valve stem disposed in the internal bypass passage to selectively close off or restrict the flow of fluid through the internal bypass passage, and a spring for applying a force to the valve stem to urge it to the closed position, said valve stem being adjustable to selectively close the internal bypass passage so as to permit the full application of pressurized fluid to the steering box, or to open the internal bypass passage selectively to permit a predetermined bypass of fluid from the first line to the second line so as to reduce the fluid pressure applied to the steering box and thus reduce the power assist afforded by the steering box, as desired, said valve stem being urged to open the internal bypass passage by fluid pressure within the first line, whereby there is provided self-compensation of the power steering valve during operation.

2. A vehicle steering system as in claim 1, wherein the adjustable power steering valve housing includes a cap that is adjustably connected to the housing for adjusting the position of the valve in the internal bypass passage.

3. A vehicle steering system as in claim 2 wherein a spring is provided between the cap and the valve.

4. A vehicle steering system as in claim 3, wherein the housing includes a sleeve extending therefrom.

5. A vehicle steering system as in claim 4, wherein the cap is threadedly connected to the sleeve to provide for desired bypass of fluid.

6. A vehicle steering system as in claim 5, wherein a lock nut is provided on the sleeve to lock the cap in selected adjusted position.

7. In a vehicle steering system including a fluid reservoir, a pump for pressurizing fluid from the reservoir, a steering box, a first line communicating the pump to the steering box, and a second line communicating the steering box and the reservoir, the pressure in the first line being greater than the pressure in the second line, the improvement comprising an adjustable power steering valve disposed between the first line and the second line for selectively varying the pump pressure to the steering box, said adjustable power steering valve including a housing having an internal bypass passage that communicates the first line and the second line, a valve stem disposed in the internal bypass passage to selectively close off or restrict the flow of fluid through the internal bypass passage, and a spring for applying a force to the valve stem to urge it to the closed position, the pressure in the first line acting upon the end of the valve stem to urge the valve stem toward an open position to permit flow through the internal bypass passage in opposition to the spring, thereby providing self-compensation of the power steering valve during operation.

\* \* \* \* \*